US009024850B2

(12) United States Patent
Lee et al.

(10) Patent No.: US 9,024,850 B2
(45) Date of Patent: May 5, 2015

(54) LIQUID CRYSTAL DISPLAY

(75) Inventors: Bong-Jun Lee, Seoul (KR); Jong-Hwan Lee, Anyang-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 534 days.

(21) Appl. No.: 12/625,298

(22) Filed: Nov. 24, 2009

(65) Prior Publication Data

US 2010/0156771 A1 Jun. 24, 2010

(30) Foreign Application Priority Data

Dec. 18, 2008 (KR) ........................ 10-2008-0129430

(51) Int. Cl.
G09G 3/36 (2006.01)
G02F 1/1362 (2006.01)

(52) U.S. Cl.
CPC ........ *G02F 1/136286* (2013.01); *G09G 3/3614* (2013.01); *G09G 3/3648* (2013.01); *G09G 2300/0426* (2013.01); *G09G 2310/0205* (2013.01)

(58) Field of Classification Search
USPC ............. 345/87–100, 55, 104, 694, 695, 696; 349/39, 42, 84, 57, 58
See application file for complete search history.

(56) References Cited

U.S. PATENT DOCUMENTS

| | | | |
|---|---|---|---|
| 6,140,990 A | 10/2000 | Schlig | |
| 6,707,441 B1 * | 3/2004 | Hebiguchi et al. | 345/92 |
| 6,958,791 B2 | 10/2005 | Shimoshikiryo | |
| 7,079,214 B2 | 7/2006 | Shimoshikiryo | |
| 7,283,192 B2 | 10/2007 | Shimoshikiryo | |
| 7,629,955 B2 | 12/2009 | Asao et al. | |
| 7,868,861 B2 * | 1/2011 | Cho et al. | 345/87 |
| 8,044,905 B2 * | 10/2011 | Kasahara | 345/92 |
| 2003/0227429 A1 | 12/2003 | Shimoshikiryo | |
| 2004/0130513 A1 * | 7/2004 | Miyazawa | 345/76 |
| 2005/0213015 A1 | 9/2005 | Shimoshikiryo | |
| 2006/0256271 A1 | 11/2006 | Shimoshikiryo | |
| 2007/0008263 A1 | 1/2007 | Kim | |
| 2008/0106535 A1 * | 5/2008 | Kim et al. | 345/205 |

(Continued)

FOREIGN PATENT DOCUMENTS

| | | |
|---|---|---|
| JP | 10-197894 | 7/1998 |
| JP | 2003-005214 | 1/2003 |

(Continued)

OTHER PUBLICATIONS

Machine translation of Japan publication 10-197894 by Morosawa Katsuhiko on Jul. 31, 1998.*

(Continued)

*Primary Examiner* — Srilakshmi Kumar
*Assistant Examiner* — Linh N Hoffner
(74) *Attorney, Agent, or Firm* — F. Chau & Associates, LLC

(57) ABSTRACT

A liquid crystal display is provided. The liquid crystal display includes a pixel array having a plurality of pixels in a matrix on a substrate. First and second pixels are adjacent to each other along a first direction. The first and second pixels each include first and second switching elements. A first common gate line extends in a second direction different from the first direction and is commonly connected to the first and second switching elements. First and second data lines extend in the first direction and are connected to the first and second switching elements, respectively.

7 Claims, 10 Drawing Sheets

(56) References Cited

U.S. PATENT DOCUMENTS

| | | | |
|---|---|---|---|
| 2008/0150859 A1* | 6/2008 | Song et al. | 345/87 |
| 2008/0266225 A1* | 10/2008 | Kim | 345/88 |
| 2009/0189881 A1* | 7/2009 | Ooishi et al. | 345/211 |
| 2010/0085348 A1* | 4/2010 | Bae et al. | 345/213 |
| 2010/0177107 A1* | 7/2010 | Park et al. | 345/545 |

FOREIGN PATENT DOCUMENTS

| | | |
|---|---|---|
| JP | 2004-062146 | 2/2004 |
| JP | 2005165038 | 5/2006 |
| JP | 2006195436 | 7/2006 |
| KR | 10-2008-0041089 | 5/2008 |

OTHER PUBLICATIONS

English Abstract for Publication No. 10-197894.
English Abstract for Publication No. 2003-005214.
English Abstract for Publication No. 2004-062146.
Japanese office action dated Jun. 25, 2013.
European Search Report dated Mar. 23, 2010 for Application No. 09014970.9-2205.
Korean Office Action Dated Aug. 19, 2014.

* cited by examiner

LIQUID CRYSTAL DISPLAY

CROSS-REFERENCE TO RELATED APPLICATION

This application claims priority to and the benefit of Korean Patent Application No. 10-2008-0129430 filed on Dec. 18, 2008 in the Korean Intellectual Property Office, the entire content of which is incorporated by reference herein.

BACKGROUND OF THE INVENTION

1. Field of the Invention

The present disclosure relates to a liquid crystal display, and more particularly, to liquid crystal display pixel arrays.

2. Discussion of the Related Art

A liquid crystal display (LCD) is a widely used flat panel display (FPD). It is composed of two display panels on which are formed field generating electrodes, such as pixel electrodes and a common electrode. A liquid crystal layer is interposed between the two display panels. A voltage is applied to the field generating electrodes to generate an electric field in the liquid crystal layer. The orientation of liquid crystal molecules of the liquid crystal layer is determined and the polarization of incident light is controlled through the generated electric field to display an image.

In the LCD, a thin film transistor (TFT) array includes gate lines for transmitting scanning signals and data lines for transmitting data lines crossing each other to define pixels. Each pixel of the array includes a TFT connected to a gate line and a data line, and a pixel electrode connected to the TFT. A pixel array is formed on the TFT array using a plurality of pixels, each including the TFT.

Since a data driver of an LCD is typically a high-priced, highly functional device as compared to a gate driver, it becomes difficult to mount the data driver directly on a glass substrate using amorphous silicon TFTs. In addition, as the number of channels used increases, the manufacturing cost sharply increases. Therefore, in order to reduce the manufacturing cost, it becomes helpful to reduce the number of data driver circuits and/or the number of channels. It also becomes helpful for the LCDs to have pixel arrays which provide sufficient charging time for the gate driver circuits.

SUMMARY OF THE INVENTION

An exemplary embodiment of the present invention provides an LCD which reduces the number of data driver circuits and/or the number of channels and provides appropriate charging time for gate driver circuits.

An exemplary embodiment of an LCD includes a pixel array having a plurality of pixels in a matrix on a substrate. The matrix has at least a first pixel row and a second pixel row adjacent the first pixel row. Both the first pixel row and the second pixel row extend in a first direction. A first pixel and a second pixel of the first pixel row are adjacent to each other along the first direction. The first pixel and the second pixel respectively include a first switching element and a second switching element. A first common gate line extends in a second direction different from the first direction and is commonly connected to the first switching element and to the second switching element. A first data line and a second data line extend in the first direction and are connected to the first switching element and to the second switching element, respectively.

The substrate may have a long side and a short side, the long side being substantially parallel to the first direction, and the short side being substantially parallel to the second direction.

A length of the first pixel in the second direction may be greater than a length of the first pixel in the first direction.

The pixel array may alternately display colors of red, green and blue in the first direction and display the same color in the second direction.

A pair of a first data line and a second data line may be in each row of the pixel array.

Each of the pixels may include a switching element, respectively, and switching elements of a column of pixels in the pixel array may be alternately connected to a first data line of a row and to a second data line in an adjacent row.

A third data line may be further provided on the substrate. The first data line, the second data line and the third data line may be on the substrate at repeated intervals. The second data line and the third data line may be opposed to and substantially parallel to each other. The first pixel row may be between the first data line and the second data line. The second pixel row may be between the third data line and the first data line.

A second common gate line may be further provided on the substrate. The first common gate line and second common gate line may be on the substrate at repeated intervals. The second common gate line may be adjacent to and substantially parallel to the first common gate line. The second pixel may be between the first common gate line and the second common gate line.

The pixel array may include six pixels in a 2×3 matrix, the six pixels including the first pixel, the second pixel, a third pixel, a fourth pixel, a fifth pixel and a sixth pixel. The first pixel, the second pixel, and the third pixel having a third switching element, may be in the first pixel row. The fourth pixel, the fifth pixel and the sixth pixel, respectively including a fourth switching element, a fifth switching element and a sixth switching element, may be in the second pixel row. The third switching element may be connected to the second common gate line and to the second data line. The fourth switching element may be connected to the first common gate line and to the third data line. The fifth switching element may be connected to the second common gate line and to the third data line. The sixth switching element may be connected to the second common gate line and to the first data line.

To the first data line, a first signal may be consecutively applied twice followed by a second signal consecutively applied twice, at repeated intervals. To the second data line, the second signal may be consecutively applied twice followed by the first signal consecutively applied twice, at repeated intervals. To the third data line, the first signal may be consecutively applied twice followed by the second signal consecutively applied twice, at repeated intervals.

The first signal and the second signal may be alternately applied to adjacent data lines.

A third data line may be further provided on the substrate. The first data line, the second data line and the third data line may be on the substrate at repeated intervals. The third data line and the second data line may be opposed to and substantially parallel to each other. The first pixel row may be between the second data line and the first data line. The second pixel row may be between the first data line and the third data line.

A second common gate line may be further provided on the substrate. The first common gate line and the second common gate line may be on the substrate at repeated intervals. The second common gate line may be adjacent to and substantially parallel to the first common gate line. The second pixel may be between the first common gate line and the second common gate lines.

The pixel array may include 12 pixels in a 2×6 matrix. The first pixel row may include the first pixel, the second pixel, a third pixel, a fourth pixel, a fifth pixel and a sixth pixel, respectively including the first switching element, the second switching element, a third switching element, a fourth switching element, and a sixth switching element, along the first direction. The second pixel row may include a seventh pixel, an eighth pixel, a ninth pixel, a tenth pixel, an eleventh pixel and a twelfth pixel, respectively including a seventh switching element, an eighth switching element, a ninth switching element, a tenth switching element an eleventh switching element and a twelfth switching element, along the first direction. The third switching element may be connected to the second common gate line and to the second data line. The fourth switching element may be connected to a second first common gate line and to the second data line. The fifth switching element may be connected to a second common gate line and to the second data line. The sixth switching element may be connected to the second common gate line and to the first data line. The seventh switching element may be connected to the first common gate line and to the third data line. The eighth switching element may be connected to the second common gate line and to the third data line. The ninth switching element may be connected to the second common gate line and to the first data line. The tenth switching element may be connected to a second first common gate line and to the first data line. The eleventh switching element may be connected to the second first common gate line and to the third data line. The twelfth switching element may be connected to the second common gate line and to the third data line.

The first signal and the second signal may be alternately applied to adjacent data lines.

A third data line may be further provided on the substrate. The first data line, the second data line and the third data line may be on the substrate at repeated intervals. The third data line and the first data line may be opposed to and substantially parallel to each other. The first pixel row may be between the first data line and the second data line. The second pixel row may be between the second data line and the third data line.

A second common gate line may be further provided on the substrate. The first common gate line and the second common gate line may be on the substrate at repeated intervals. The second common gate line may be adjacent to and substantially parallel to the first common gate line. The second pixel may be between the first common gate line and the second common gate line.

The pixel array may include 12 pixels in a 2×6 matrix. The first pixel row may include the first pixel, the second pixel, a third pixel, a fourth pixel, a fifth pixel and a sixth pixel, respectively including the first switching element, the second switching element, a third switching element, a fourth switching element, a fifth switching element and a sixth switching element, along the first direction. The second pixel row may include a seventh pixel, an eighth pixel, a ninth pixel, a tenth pixel, an eleventh pixel and a twelfth pixel, respectively including a seventh switching element, an eighth switching element, a ninth switching element, a tenth switching element, an eleventh switching element and a twelfth switching element, along the first direction. The third switching element may be connected to the second common gate line and to the first data line. The fourth switching element may be connected to a second first common gate line and to the first data line. The fifth switching element may be connected to a second common gate line and to the second data line. The sixth switching element may be connected to the second common gate line and to the second data line. The seventh switching element may be connected to the first common gate line and to the third data line. The eighth switching element may be connected to the second common gate line and to the second data line. The ninth switching element may be connected to the second common gate line and to the third data line. The tenth switching element may be connected to the second first common gate line and to the second data line. The eleventh switching element may be connected to the second first common gate line and to the third data line. The twelfth switching element may be connected to the second common gate line and to the third data line.

The first signal and the second signal may be alternately applied to adjacent data lines.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS

Figure 1:
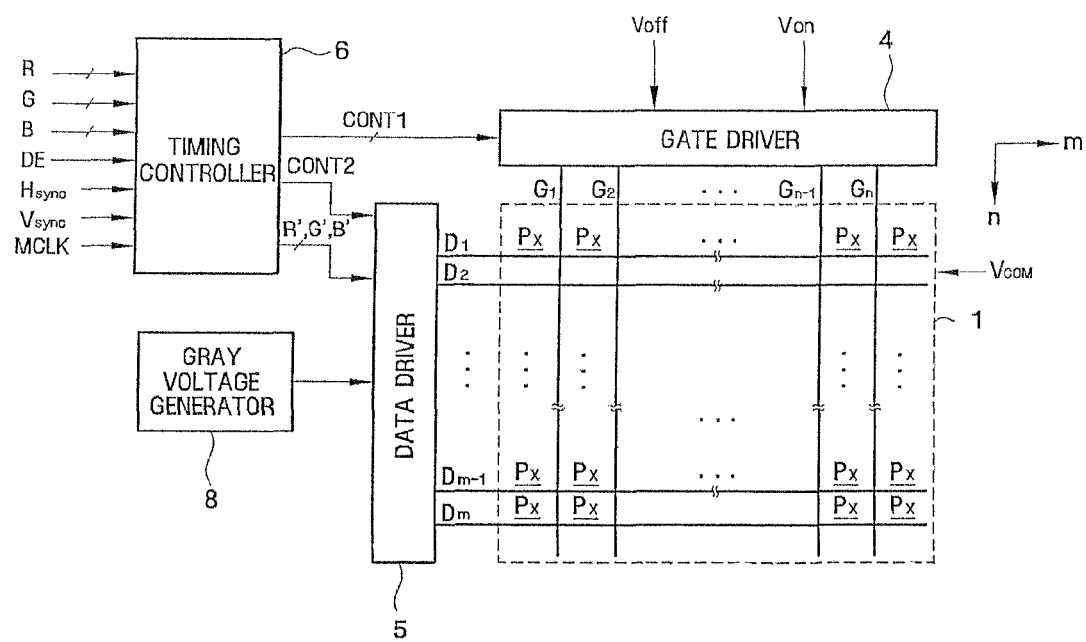
FIG. 1 is a block diagram of an LCD according to an exemplary embodiment of the present invention.

It will be understood that when an element or layer is referred to as being "on" another element or layer, it can be directly on to the other element or layer or intervening elements or layers may be present. Like reference numerals refer to like elements throughout the specification.

Hereinafter, LCDs according to exemplary embodiments of the present invention will be described with reference to the accompanying drawings.

Referring now to FIG. 1, the LCD includes a TFT display panel 1, a gate driver 4 connected to the TFT display panel 1, a data driver 5, a gray voltage generator 8 connected to the data driver 5, and a timing controller 6 for controlling the drivers.

The TFT display panel 1 includes a plurality of display signal lines $G_1, G_2, \ldots G_{n-1}, G_n, D_1, D_2, \ldots D_{m-1}, D_m$ and a plurality of pixels $P_X$ connected thereto and substantially in a matrix. Gate lines $G_1, G_2, \ldots Gn-1$, Gn transmit gate signals while data lines $D_1, D_2, \ldots D_{m-1}, D_m$ transmit data signals.

The gate lines $G_1, G_2, \ldots Gn-1$, Gn extend in a column direction and are substantially parallel to each other, while the data lines $D_1, D_2, \ldots D_{m-1}, D_m$ extend in a row direction and are substantially parallel to each other. The TFT panel 1 of the LCD according to embodiments of the present invention will be described below in more detail.

The gray voltage generator 8 generates two sets of a plurality of gray voltages related to the transmittance of the pixels $P_X$. The gray voltages in one set have a positive polarity with respect to a common voltage $V_{COM}$, while those in the other set have a negative polarity with respect to the common voltage $V_{COM}$.

The gate driver 4 is connected to the gate lines $G_1, G_2, \ldots$ Gn-1, Gn of the TFT panel 1 and synthesizes the gate-on voltage Von and the gate off voltage Voff from an external device to generate gate signals for application to the gate lines $G_1, G_2, \ldots$ Gn-1, Gn.

The data driver 5 is connected to the data lines $D_1, D_2, \ldots D_{m-1}, D_m$ of the TFT panel 1 and applies data voltages, selected from the gray voltages supplied from the gray voltage generator 8, to the data lines $D_1, D_2, \ldots D_{m-1}, D_m$. The data driver 5 may include a plurality of ICs.

The timing controller 6 generates control signals for controlling the operations of the gate driver 4 and the data driver 5 and supplies the gate driver 4 and the data driver 5 with the corresponding control signals.

Now, the operation of the LCD will be described in more detail.

The timing controller 6 is supplied with red, green and blue image signals R, G, B and input control signals controlling the display thereof such as a vertical synchronization signal $V_{sync}$, a horizontal synchronization signal $H_{sync}$, a main clock MCLK, and a data enable signal DE, from an external graphics controller (not shown). After generating gate control signals CONT1 and data control signals CONT2 and processing and modifying the three color input image signals R, G, B into four color image signals R', G', B' suitable for the operation of the TFT panel 1 on the basis of the input control signals and the image signals R, G, B, the timing controller 6 provides the gate control signals CONT1 for the gate driver 4, and the processed and modified image signals R', G', B' and the data control signals CONT2 for the data driver 5.

The gate control signals CONT1 include a scanning start signal STV for instructing to start scanning, at least a clock signal for controlling the output of the gate-on voltage Von, a gate clock signal CPV for controlling the output timing of the gate-on voltage Von, and an output enable signal OE for defining a pulse width of the gate-on voltage Von.

The data control signals CONT2 include a horizontal synchronization start signal STH for informing of start of a horizontal period, a load signal LOAD for instructing to apply the data voltages to the data lines $D_1, D_2, \ldots D_{m-1}, D_m$, an inversion control signal RVS for reversing the polarity of the data voltages (with respect to the common voltage $V_{COM}$), and a data clock signal HCLK.

The data driver 5 receives a packet of the image data R', G', B' for a row of pixels $P_X$ from the timing controller 6 and converts the image data R', G', B' into analog data voltages selected from the gray voltages supplied from the gray voltage generator 8 in response to the data control signals CONT2 from the timing controller 6.

Responsive to the vertical synchronization start signal STV and the gate clock signal CPV supplied from the timing controller 6, the gate driver 4 applies the gate-on voltage Von having a period of ½ H to the gate lines $G_1, G_2, \ldots$ Gn-1, Gn to turn on the switching elements $Q_1, Q_2$ (see FIG. 2) connected to the gate lines $G_1, G_2, \ldots$ Gn-1, Gn. Here, the gate-on voltage Von may be sequentially applied to the gate lines $G_1, G_2, \ldots$ Gn-1, Gn in a row direction.

While the gate-on voltage Von is applied to the gate lines $G_1, G_2, \ldots$ Gn-1, Gn and the switching elements $Q_1, Q_2$ connected to the gate lines $G_1, G_2, \ldots$ Gn-1, Gn are turned on, the data driver 5 applies the data voltages to the data lines $D_1, D_2, \ldots D_{m-1}, D_m$.

The data voltages applied to the data lines $D_1, D_2, \ldots D_{m-1}, D_m$ are applied to the corresponding pixels $P_X$ through the turned-on switching elements $Q_1, Q_2$.

A variation in electric fields generated by pixel electrodes (not shown) in cooperation with a common electrode (not shown) reorients liquid crystal molecules, and the variation in the polarized light causes a change in the transmittance of light by a polarizer (not shown) attached to a display panel (not shown).

In this manner, during a period of one frame, the gate-on voltage Von is sequentially applied to all the gate lines $G_1, G_2, \ldots$ Gn-1, Gn to apply data voltages to all the pixels. When the next frame starts after finishing one frame, the inversion control signal RVS applied to the data driver 5 is controlled such that the polarity of the data voltages is reversed (which is called "frame inversion"). The inversion control signal RVS may be also controlled such that the polarity of the data voltages flowing in a data line in one frame are reversed (which is called "line inversion"), or the polarity of the data voltages in one pixel row are reversed (which is called "dot inversion").

The gate driver 4 in accordance with an exemplary embodiment of the present invention may be formed of IC chips at one side or upper and lower sides of the TFT display panel 1, thereby preventing the TFT display panel 1 from becoming bulky.

Figure 2:
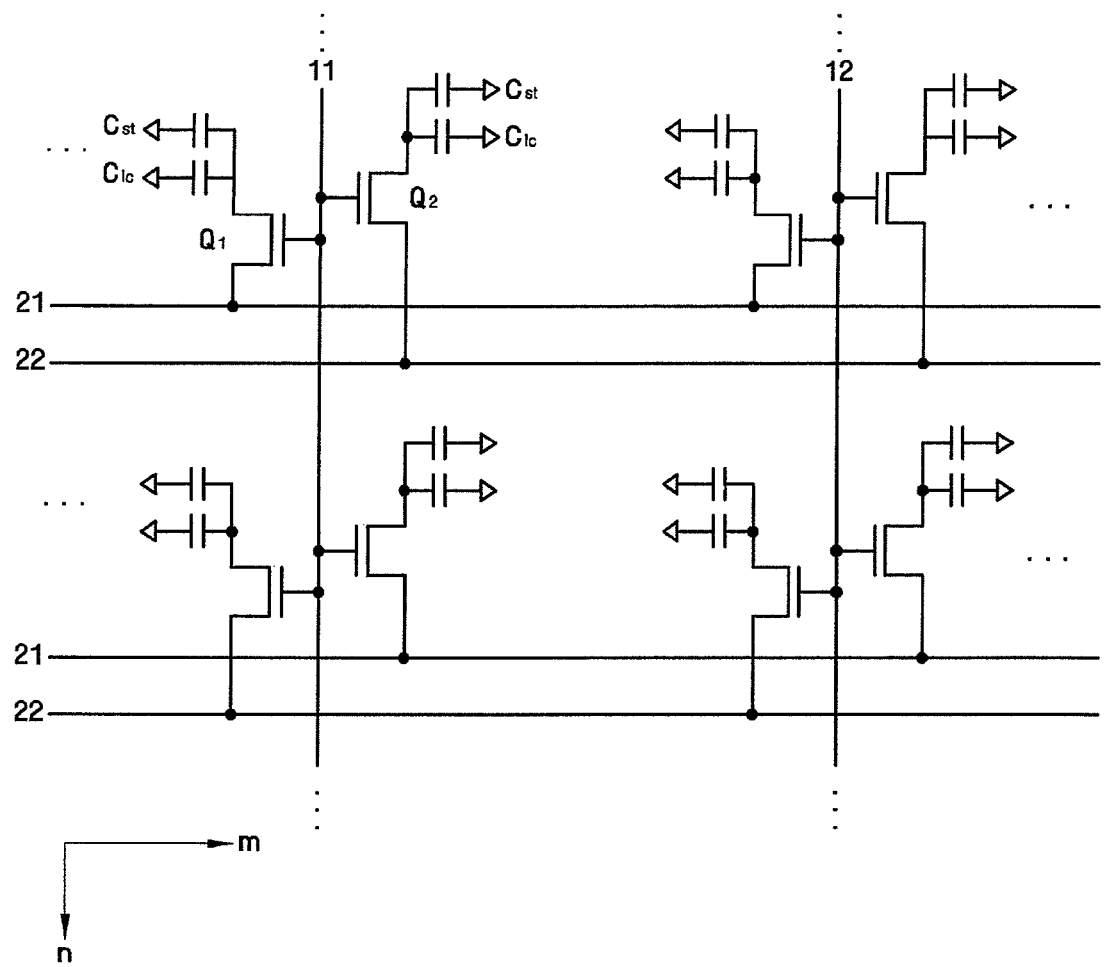
FIG. 2 is an equivalent circuit diagram of a TFT display panel of the LCD shown in FIG. 1.
Figure 3:
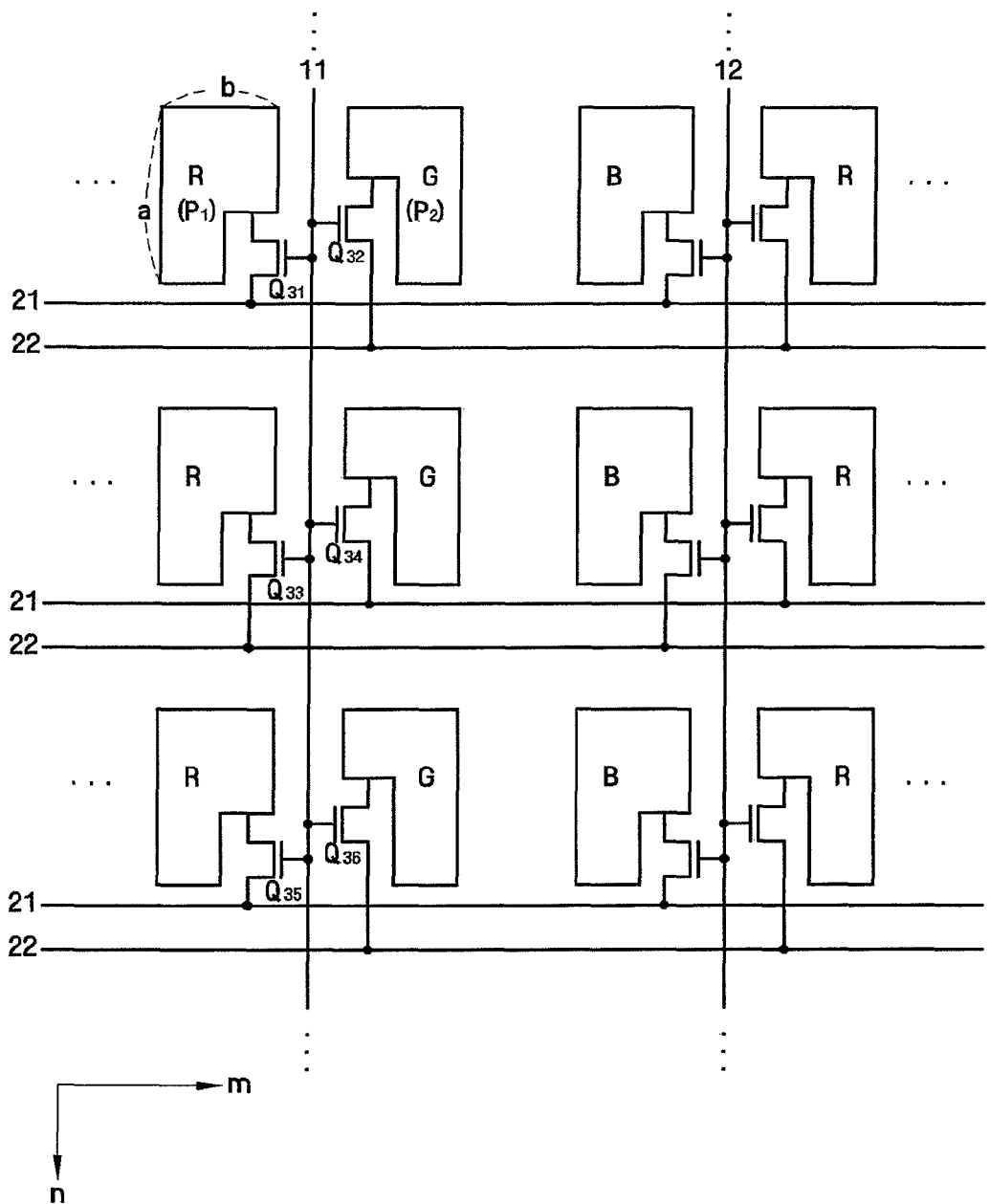
FIG. 3 illustrates a pixel array of the LCD shown in FIG. 2.

FIG. 2 is an equivalent circuit diagram of a TFT display panel 1 of an LCD according to an embodiment of the present invention, and FIG. 3 illustrates a pixel array of the LCD shown in FIG. 2. The LCD according to an embodiment of the present invention will now be described with reference to FIGS. 1 through 3.

A pixel array having a plurality of pixels in a matrix is formed on a substrate.

In the pixel array, first and second pixels $P_1, P_2$ of FIG. 3, which are adjacent to each other in a first direction m, include first and second switching elements $Q_1, Q_2$ of FIG. 2, respectively. A liquid crystal capacitor $C_{lc}$ and a storage capacitor $C_{st}$ are connected to each of the switching elements $Q_1, Q_2$. If unnecessary, the storage capacitor $C_{st}$ may be omitted.

The switching elements $Q_1, Q_2$ have three terminals. A gate terminal is connected to a first common gate line 11. A source terminal is connected to first or second data lines 21, 22. A drain terminal is connected to the liquid crystal capacitor $C_{lc}$ and the storage capacitor $C_{st}$. Here, the first and second data lines 21, 22 extend in the first direction m.

The switching elements $Q_1, Q_2$ are commonly connected to the first common gate line 11 extending in a second direction n that is different from the first direction m.

In more detail, the switching elements $Q_1, Q_2$ are connected to the gate lines 11, 12 and the data lines 21, 22 as follows.

The switching elements $Q_1, Q_2$ are positioned at left and right sides of the first common gate line 11 in the first direction m. The switching element $Q_1$ positioned at the left side of the first common gate line 11 has its source electrode connected to the first data line 21, and the switching element $Q_2$ positioned at the right side of the first common gate line 11 has its source electrode connected to the second data line 22, forming a row of pixels. Alternatively, the connection relationship of the switching elements $Q_1, Q_2$ with respect to the gate lines 11, 12 and the data lines 21, 22 may be reversed.

That is to say, the switching element $Q_1$ positioned at the left side of the first common gate line 11 may have its source electrode connected to the second data line 22, and the switching element $Q_2$ positioned at the right side of the first common gate line 11 may have its source electrode connected to the first data line 21, forming a row of pixels.

Referring to FIG. 3, the first and second data lines 21, 22 may be a pair on each row of the pixel array. Each of the pixels sharing common gate line 11 includes one of the switching elements $Q_{31}$, $Q_{32}$, $Q_{33}$, $Q_{34}$, $Q_{35}$, $Q_{36}$. Here, the switching elements $Q_{31}$, $Q_{33}$, $Q_{35}$ or the switching elements $Q_{32}$, $Q_{34}$, $Q_{36}$ of a column of pixels in the pixel array may be alternately connected to the first data line 21 and the second data line 22 for each row of the pixel array. In the left pixel column as viewed relative to the first common gate line 11, the switching element $Q_{31}$ of the first row is connected to the first data line 21. The switching element $Q_{33}$ of the second row is connected to the second data line 22. The switching element $Q_{35}$ of the third row is connected to the first data line 21. Conversely, in the right pixel column as viewed relative to the first common gate line 11, the switching element $Q_{32}$ of the first row is connected to the second data line 22. The switching element $Q_{34}$ of the second row is connected to the first data line 21. The switching element $Q_{36}$ of the third row is connected to the second data line 22. Alternatively, as mentioned above, the connection relationship of the switching elements in the pixel array may be reversed.

The liquid crystal capacitor $C_{lc}$ includes a pixel electrode provided on the TFT display panel 1 and a common electrode provided on a color filter display panel as two terminals. A liquid crystal layer between the two electrodes functions as a dielectric of the liquid crystal capacitor $C_{lc}$. The pixel electrode is connected to the switching elements $Q_1$, $Q_2$, and the common electrode is formed on the entire surface of the TFT display panel 1 and receives the common voltage $V_{COM}$.

The storage capacitor $C_{st}$ includes the pixel electrode and a separate signal line (not shown), which is provided on the TFT display panel 1, overlaps the pixel electrode via an insulator, and is supplied with a predetermined voltage such as the common voltage $V_{COM}$. Alternatively, the storage capacitor $C_{st}$ includes the pixel electrode and an adjacent gate line called a previous gate line, which overlaps the pixel electrode via an insulator.

The substrate for the TFT display panel 1 of FIG. 1 having the pixel array may have long sides and short sides. As seen in FIG. 1, the long sides are substantially parallel to the first direction m, and the short sides are substantially parallel to the second direction n. Accordingly, the data driver 5 may be at the short sides of the substrate.

In the pixel array formed by the first and second pixels $P_1$, $P_2$, a length a of each of the first and second pixels $P_1$, $P_2$ in the second direction n is greater than a length b thereof in the first direction m.

The pixel array may alternately represent colors of red (R), green (G) and blue (B) in the first direction m (i.e., in a row direction) and represent the same color in the second direction n (i.e., in a column direction).

Figure 4A:
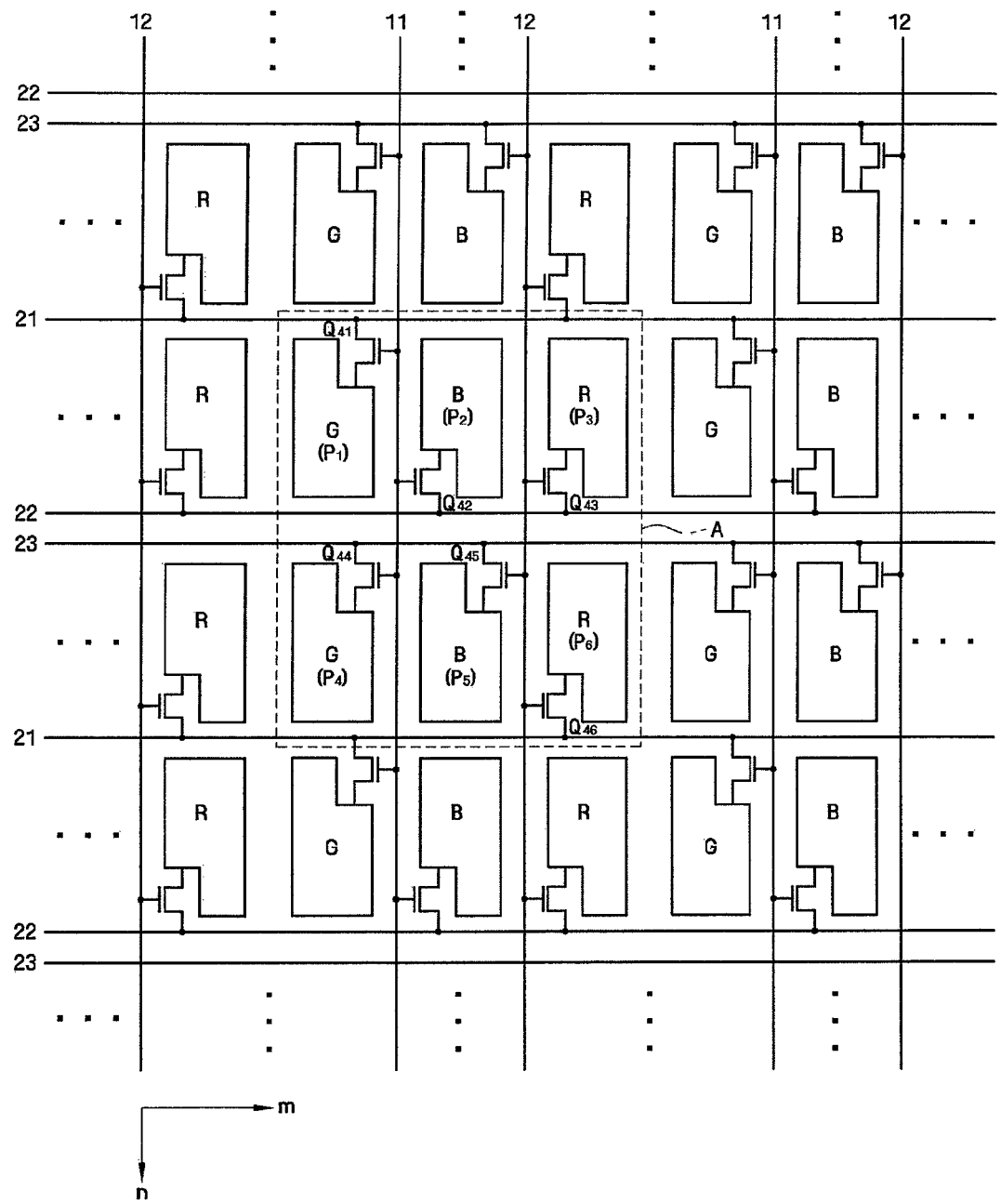
FIG. 4A illustrates a pixel array of the LCD according to an exemplary embodiment of the present invention.
Figure 4B:
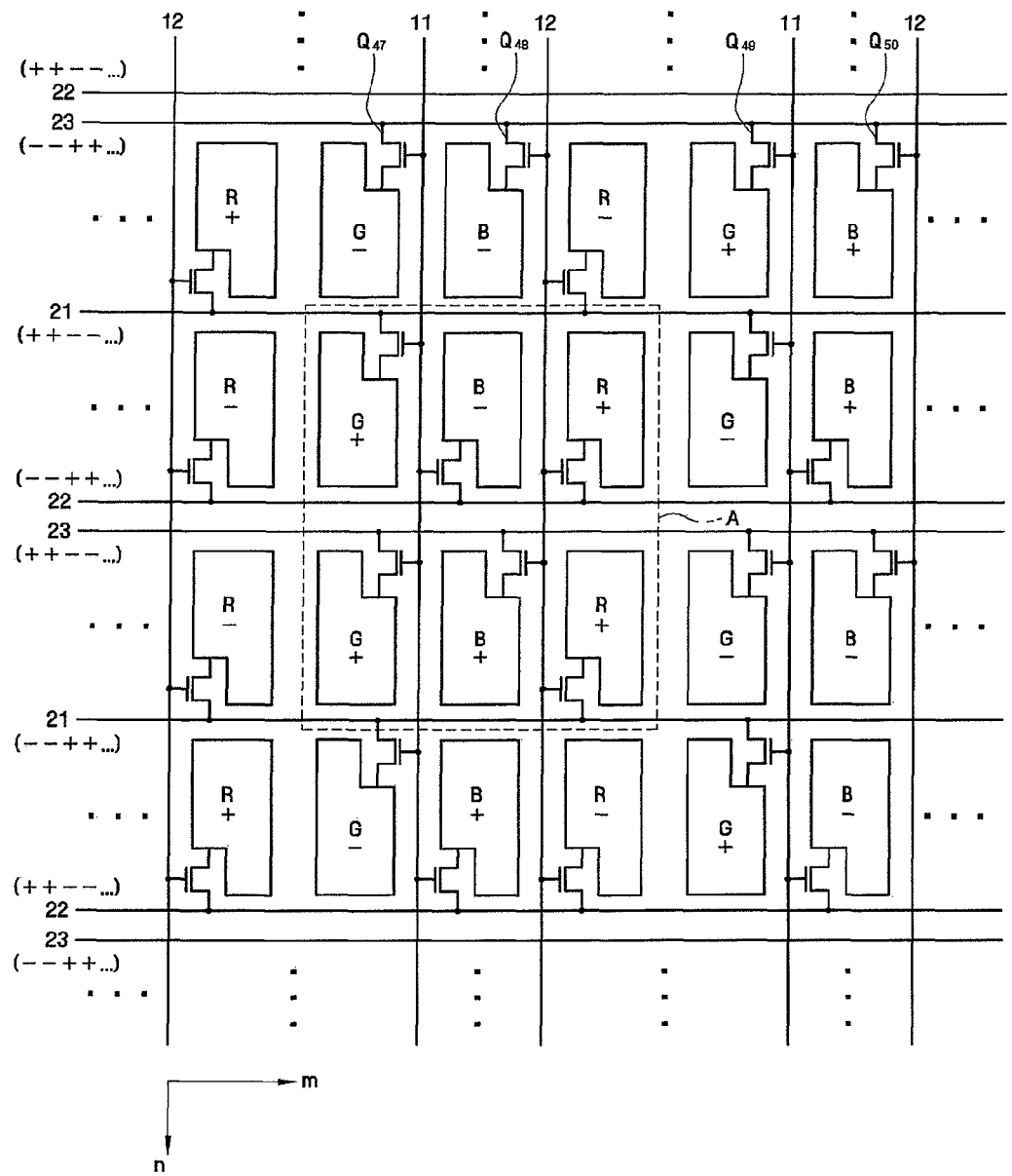
FIG. 4B illustrates signals applied to data lines of the pixel array shown in FIG. 4A being subjected to 2×1 inversion.
Figure 4C:
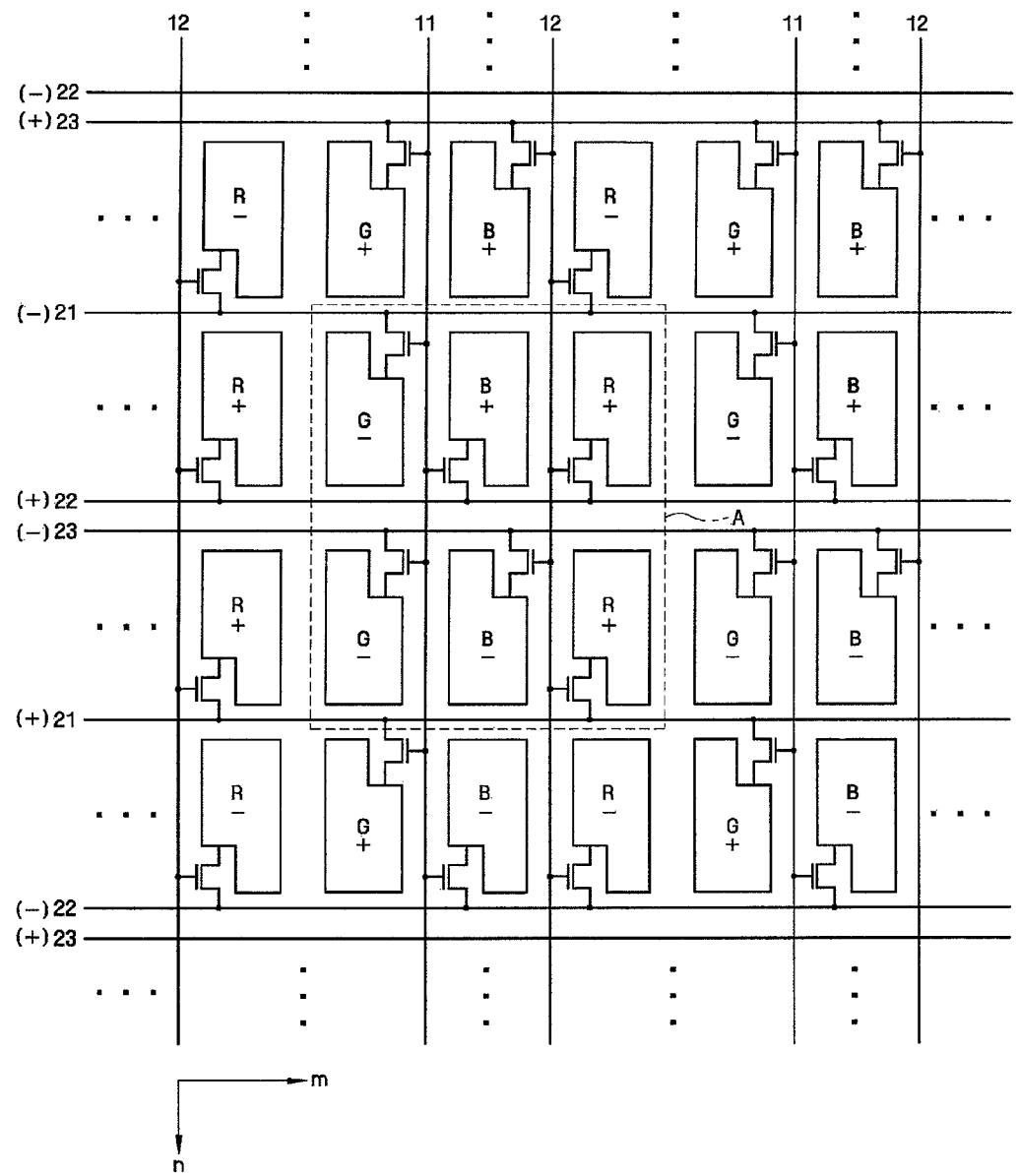
FIG. 4C illustrates signals applied to data lines of the pixel array shown in FIG. 4A being subjected to column inversion.

FIG. 4A illustrates a pixel array of an LCD according to an exemplary embodiment of the present invention. FIG. 4B illustrates that signals applied to data lines of the pixel array shown in FIG. 4A are subjected to 2×1 inversion. FIG. 4C illustrates that signals applied to data lines of the pixel array shown in FIG. 4A are subjected to column inversion. The LCD according to the exemplary embodiment of the present invention will now be described with reference to FIGS. 4A through 4C.

Referring to FIG. 4A, a pixel array having a plurality of pixels in a matrix is formed on a substrate. In the pixel array, first and second pixels $P_1$, $P_2$, adjacent to each other along a first direction m, include first and second switching elements $Q_{41}$, $Q_{42}$, respectively. In addition, the first common gate line 11 extends in a second direction n different from the first direction m, and is commonly connected to the first and second switching elements $Q_{41}$, $Q_{42}$. The first and second data lines 21, 22 extend in the first direction m, and are connected to the first and second switching elements $Q_{41}$, $Q_{42}$, respectively.

The LCD according to the exemplary embodiment of the present invention further includes a third data line 23 on the substrate. The first through third data lines 21, 22, 23 are on the substrate at repeated intervals. Here, one single data line, i.e., the first data line 21, and a pair of data lines, i.e., the second and third data lines 22, 23, alternate at repeated intervals.

In particular, the first to third data lines 21, 22, 23 are such that six pixels included in the pixel array are in a 2×3 matrix portion A in FIG. 4A. That is to say, the first and second data lines 21, 22 are such that the first pixel row is between the first data line 21 and the second data line 22, and the second and third data lines 22, 23 are opposed to and substantially parallel to each other. In addition, the third and first data lines 23, 21 are such that the second pixel row is between the third data line 23 and the first data line 21. In the portion A, pixels $P_1$, $P_2$, $P_3$ belong to the first pixel row and pixels $P_4$, $P_5$, $P_6$ belong to the second pixel row.

The LCD according to the exemplary embodiment of the present invention further includes a second common gate line 12. The first and second common gate lines 11, 12 are on the substrate at repeated intervals. Here, the second common gate line 12 is adjacent to and substantially parallel to the first common gate line 11, and the second pixel $P_2$ is positioned between the first and second common gate lines 11, 12.

By the arrangement of the first through third data lines 21, 22, 23 and the first and second common gate lines 11, 12, six pixels $P_1$, $P_2$, $P_3$, $P_4$, $P_5$, $P_6$ in the portion A in FIG. 4A are in a 2×3 matrix. The connection relationships among the first through third data lines 21, 22, 23, the first and second common gate lines 11, 12, and the switching elements $Q_{41}$, $Q_{42}$, $Q_{43}$, $Q_{44}$, $Q_{45}$, $Q_{46}$ respectively included in the six pixels $P_1$, $P_2$, $P_3$, $P_4$, $P_5$, $P_6$ is described below in more detail.

In the first pixel row, the first and second pixels $P_1$, $P_2$, and the third pixel $P_3$ which includes the third switching element $Q_{43}$, are along the first direction m. In the second pixel row, the fourth to sixth pixels $P_4$, $P_5$, $P_6$, respectively including the fourth to sixth switching elements $Q_{44}$, $Q_{45}$, $Q_{46}$, are along the first direction m.

Here, the third switching element $Q_{43}$ is connected to the second common gate line 12 and the second data line 22. The fourth switching element $Q_{44}$ is connected to the first common gate line 11 and the third data line 23. The fifth switching element $Q_{45}$ is connected to the second common gate line 12 and the third data line 23. The sixth switching element $Q_{46}$ is connected to the second common gate line 12 and the first data line 21.

Accordingly, the pixel array of the LCD according to the exemplary embodiment of the present invention has an overall 2×3 matrix occurring at repeated intervals.

Referring to FIG. 4B, a first signal is consecutively applied twice to the first through third data lines 21, 22, 23, respectively, and then a second signal is consecutively applied twice thereto. Here, the first and second signals are inversion control signals RVS that inverse the polarity of a data voltage.

That is to say, the first signal may be a positive (+) data voltage, and the second signal may be a negative (−) data voltage, or vice versa.

For example, assuming that the first signal is a negative (−) data voltage, and the second signal is a positive (+) data voltage, the first signal, i.e., a negative (−) data voltage, is consecutively applied twice to the third data line 23 positioned at the upper portion of FIG. 4B. Then, the second signal, i.e., a positive (+) data voltage, is consecutively applied twice to the third data line 23. That is, the twice applied first signal, i.e., the negative (−) data voltage, is applied, for example, to the two switching elements $Q_{47}$, $Q_{48}$ connected to the third data line 23. Accordingly, the pixels having the two switching elements $Q_{47}$, $Q_{48}$ have negative (−) polarities. Then, the twice applied second signal, i.e., the positive (+) data voltage is applied to the two switching elements $Q_{49}$, $Q_{50}$ which are also connected to the third data line 23. Accordingly, pixels including the two switching elements $Q_{49}$, $Q_{50}$ have positive (+) polarities.

A first signal and a second signal having opposite polarities of those applied to the third data line 23 are applied to the first data line 21 adjacent to the upper third data line 23. That is to say, the first signal, i.e., the positive (+) data voltage, is consecutively applied to the first data line 21 twice. Next, the second signal, i.e., the negative (−) data voltage, is consecutively applied to the first data line 21 twice.

Similarly, the first signal and the second signal having opposite polarities of those applied to the first data line 21 are applied to the second data line 22 adjacent to the first data line 21.

Polar staining which may appear on a particular pixel array can be prevented by performing 2×1 inversion on the data signals and the pixel array having the 2×3 matrix occurring at repeated intervals. In addition, one single data line, i.e., the first data line 21, and a pair of data lines, i.e., the second and third data lines 22, 23, are alternately in a row, thereby preventing horizontal stripes from being visible on the LCD.

Referring to FIG. 4C, the first and second signals are alternately applied to the respective first through third data lines 21, 22, 23. That is to say, when the first signal is applied to the first data line 21, the second signal is applied to the second data line 22 and the first signal is again applied to the data line 23. Accordingly, the signals applied to the respective first through third data lines 21, 22, 23 are subjected to column inversion. Here, the first signal and the second signal are substantially the same as described above.

For example, when the first signal, i.e., a positive (+) data voltage, is applied to the third data line 23 positioned at an upper portion of FIG. 4C, the second signal, i.e., a negative (−) data voltage, is applied to the first data line 21 adjacent to the third data line 23. In addition, the first signal, i.e., the positive (+) data voltage, is again applied to the second data line 22 adjacent to the first data line 21, and vice versa.

Figure 5A:
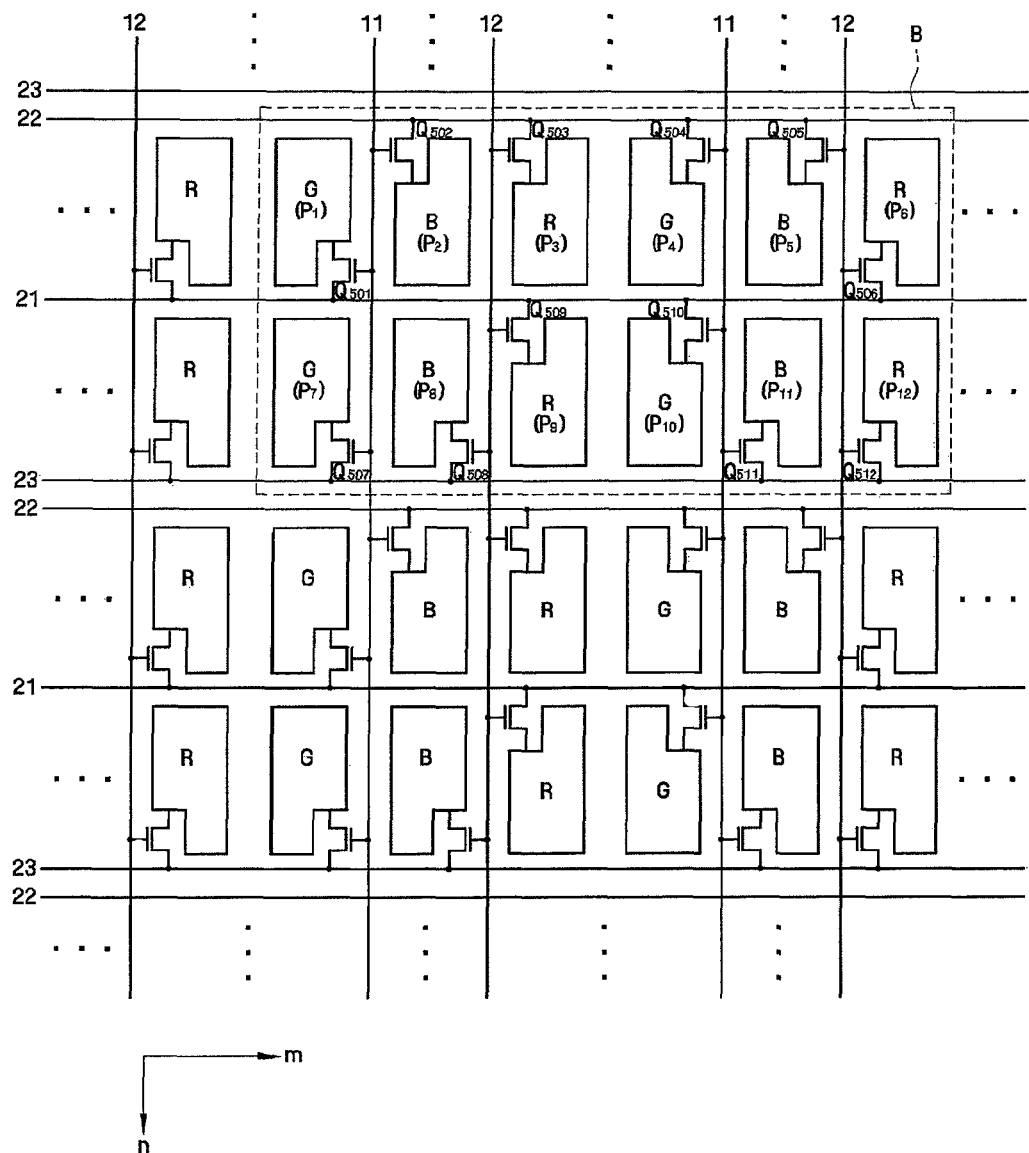
FIG. 5A illustrates a pixel array of an LCD according to an exemplary embodiment of the present invention.
Figure 5B:
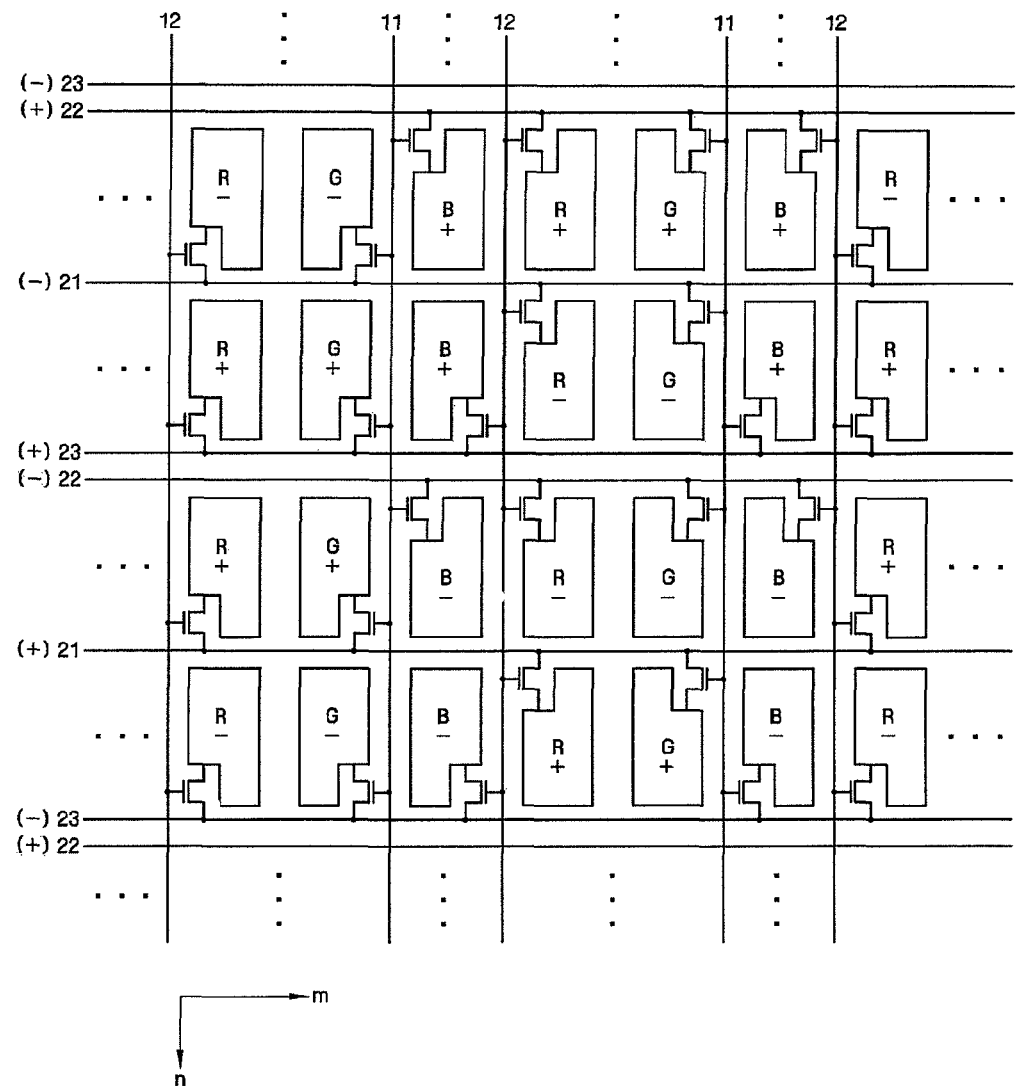
FIG. 5B illustrates signals applied to data lines of the pixel array shown in FIG. 5A being subjected to column inversion.

FIG. 5A illustrates a pixel array of an LCD according to an exemplary embodiment of the present invention, and FIG. 5B illustrates that signals applied to data lines of the pixel array shown in FIG. 5A are subjected to column inversion.

The LCD according to the exemplary embodiment of the present invention will now be described with reference to FIGS. 5A and 5B.

Referring to FIG. 5A, a pixel array having a plurality of pixels in a matrix is formed on a substrate. In the pixel array, first and second pixels $P_1$, $P_2$, adjacent to each other along a first direction m, include first and second switching elements $Q_{501}$, $Q_{502}$, respectively. In addition, the first common gate line 11 extends in a second direction n different from the first direction m, and is commonly connected to the first and second switching elements $Q_{501}$, $Q_{502}$. The first and second data lines 21, 22 extend in the first direction m, and are connected to the first and second switching elements $Q_{501}$, $Q_{502}$, respectively.

The LCD according to the exemplary embodiment of the present invention further includes a third data line 23 on the substrate. The first through third data lines 21, 22, 23 are on the substrate at repeated intervals. Here, one single data line, i.e., the first data line 21, and a pair of data lines, i.e., the second and third data lines 22, 23, alternate at repeated intervals.

In particular, the first through third data lines 21, 22, 23 are such that 12 pixels in a portion B in FIG. 5B belonging to the pixel array are in a 2×6 matrix at repeated intervals.

That is to say, the second data line and the first data line 22, 21 are in the first pixel row positioned between the second data line 22 and the first data line 21. The first data line 21 and the third data line 23 are in the second pixel row positioned between the first data line 21 and the third data line 23. The third data line 23 and the second data line 22 are opposed to each other. Here, pixels $P_1$, $P_2$, $P_3$, $P_4$, $P_5$, $P_6$ belong to the first pixel row of the portion B in FIG. 5A. Pixels $P_7$, $P_8$, $P_9$, $P_{10}$, $P_{11}$, $P_{12}$ belong to the second pixel row of the portion B.

The LCD according to the exemplary embodiment of the present invention further includes a second common gate line 12. The first and second common gate lines 11, 12 are substantially the same as those according to the exemplary embodiment of FIG. 4A, and a repeated explanation thereof will not be given.

By the arrangement of the first through third data lines 21, 22, 23 and the first and second common gate lines 11, 12, 12 pixels $P_1$, $P_2$, $P_3$, $P_4$, $P_5$, $P_6$, $P_7$, $P_8$, $P_9$, $P_{10}$, $P_{11}$, $P_{12}$, in the portion B in FIG. 5A are in a 2×6 matrix. The connection relationships among the first through third data lines 21, 22, 23, the first and second common gate lines 11, 12, and the switching elements $Q_{501}$, $Q_{502}$, $Q_{503}$, $Q_{504}$, $Q_{505}$, $Q_{506}$, $Q_{507}$, $Q_{508}$, $Q_{509}$, $Q_{510}$, $Q_{511}$, $Q_{512}$ respectively included in the 12 pixels $P_1$, $P_2$, $P_3$, $P_4$, $P_5$, $P_6$, $P_7$, $P_8$, $P_9$, $P_{10}$, $P_{11}$, $P_{12}$, is described below in more detail.

In the first pixel row, first and second pixels $P_1$, $P_2$ and third to sixth pixels $P_3$, $P_4$, $P_5$, $P_6$, respectively including third to sixth switching elements $Q_{503}$, $Q_{504}$, $Q_{505}$, $Q_{506}$, are along the first direction m. In the second pixel row, seventh to twelfth pixels $P_7$, $P_8$, $P_9$, $P_{10}$, $P_{11}$, $P_{12}$, respectively including seventh to twelfth elements $Q_{507}$, $Q_{508}$, $Q_{509}$, $Q_{510}$, $Q_{511}$, $Q_{512}$, are along the first direction m.

Here, the third switching element $Q_{503}$ is connected to the second common gate line 12 and the second data line 22. The fourth switching element $Q_{504}$ is connected to the first common gate line 11 and the second data line 22. The fifth switching element $Q_{505}$ is connected to the second common gate line 12 and the second data line 22. The sixth switching element $Q_{506}$ is connected to the second common gate line 12 and the first data line 21. The seventh switching element $Q_{507}$ is connected to the first common gate line 11 and the third data line 23. The eighth switching element $Q_{508}$ is connected to the second common gate line 12 and the third data line 23. The ninth switching element $Q_{509}$ is connected to the second common gate line 12 and the first data line 21. The tenth switching element $Q_{510}$ is connected to the first common gate line 11 and the first data line 21. The eleventh switching element $Q_{511}$ is connected to the first common gate line 11 and the third data line 23. The twelfth switching element $Q_{512}$ is connected to the second common gate line 12 and the third data line 23.

Accordingly, the pixel array of the LCD according to the exemplary embodiment of the present invention has the overall 2×6 matrix occurring at repeated intervals.

Referring to FIG. 5B, a first signal and a second signal are alternately applied to the first to third data lines 21, 22, 23, respectively, which is substantially the same as described for the exemplary embodiment of FIG. 4A and a repeated explanation thereof will not be given.

Figure 6A:
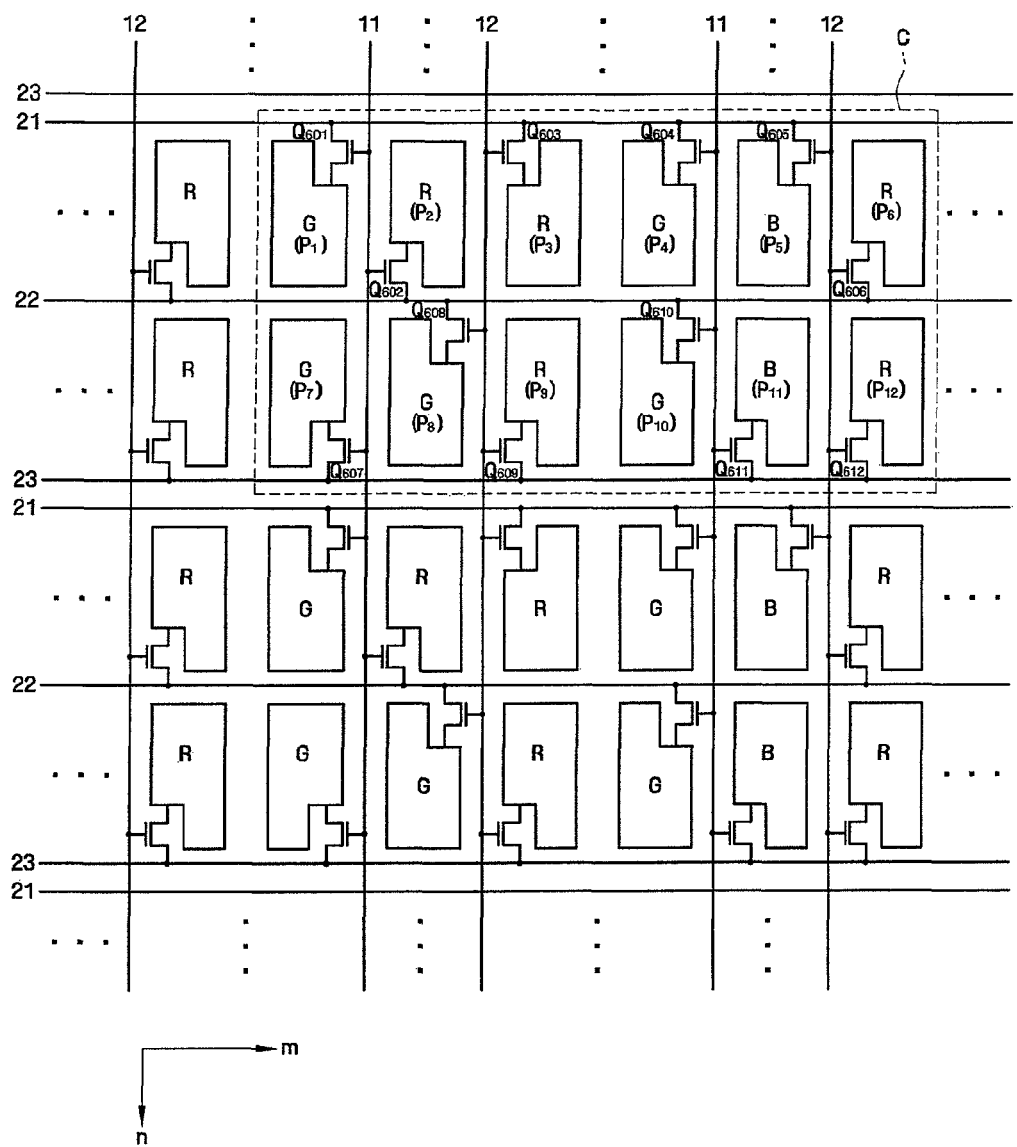
FIG. 6A illustrates a pixel array of an LCD according to an exemplary embodiment of the present invention.
Figure 6B:
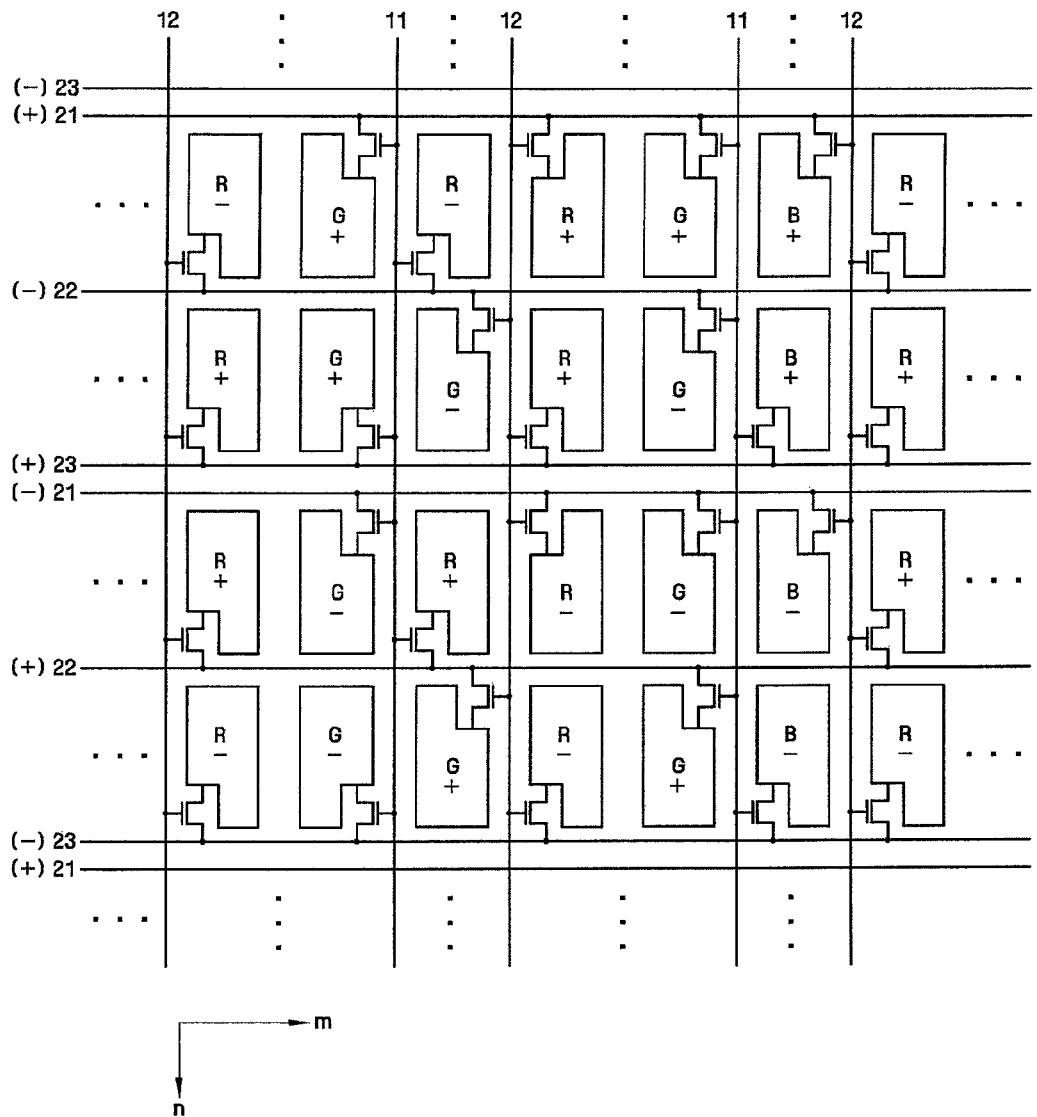
FIG. 6B illustrates signals applied to data lines of the pixel array shown in FIG. 6A being subjected to column inversion.

FIG. 6A illustrates a pixel array of an LCD according to an exemplary embodiment of the present invention, and FIG. 6B illustrates that signals applied to data lines of the pixel array shown in FIG. 6A are subjected to column inversion.

An LCD according to the exemplary embodiment of the present invention will be described with reference to FIGS. 6A and 6B. Aspects which are same as those described for the previous embodiments will not be repeated. The following description will focus on differences between the exemplary embodiment of FIG. 6A and the exemplary embodiment of FIG. 5A. Referring to FIG. 6A, the first to third data lines 21, 22, 23 are such that 12 pixels included in the pixel array are in a 2×6 matrix C in FIG. 6A and the first and second data lines 21, 22 are such that the first pixel row is between the first data line 21 and the second data line 22. In addition, the second and third data lines 22, 23 are such that the second pixel row is between the second data line 22 and the third data line 23. The third and first data lines 23, 21 are opposed to and substantially parallel to each other.

In addition, the LCD according to the exemplary embodiment of FIG. 6A further includes a second common gate line 12, which is substantially the same as described for the exemplary embodiment of FIG. 4A and a repeated explanation thereof will not be given.

By the arrangement of the first through third data lines 21, 22, 23 and the first and second common gate lines 11, 12, 12 pixels $P_1$, $P_2$, $P_3$, $P_4$, $P_5$, $P_6$, $P_7$, $P_8$, $P_9$, $P_{10}$, $P_{11}$, $P_{12}$ in the portion C in FIG. 6A are in a 2×6 matrix. The connection relationships among the first through third data lines 21, 22, 23, the first and second common gate lines 11, 12, and switching elements $Q_{601}$, $Q_{602}$, $Q_{603}$, $Q_{604}$, $Q_{605}$, $Q_{606}$, $Q_{607}$, $Q_{608}$, $Q_{609}$, $Q_{610}$, $Q_{611}$, $Q_{612}$, respectively included in the 12 pixels $P_1$, $P_2$, $P_3$, $P_4$, $P_5$, $P_6$, $P_7$, $P_8$, $P_9$, $P_{10}$, $P_{11}$, $P_{12}$, is described below in more detail.

In the first pixel row, first and second pixels $P_1$, $P_2$ and third to sixth pixels $P_3$, $P_4$ $P_5$, $P_6$, respectively including third to sixth switching elements $Q_{603}$, $Q_{604}$, $Q_{605}$, $Q_{606}$, are along the first direction m. In the second pixel row, seventh to twelfth pixels $P_7$, $P_8$, $P_9$, $P_{10}$, $P_{11}$, $P_{12}$, respectively including seventh to twelfth elements $Q_{607}$, $Q_{608}$, $Q_{609}$, $Q_{610}$, $Q_{611}$, $Q_{612}$, are along the first direction m.

Here, the third switching element $Q_{603}$ is connected to the second common gate line 12 and the first data line 21. The fourth switching element $Q_{604}$ is connected to the first common gate line 11 and the first data line 21. The fifth switching element $Q_{605}$ is connected to the second common gate line 12 and the first data line 21. The sixth switching element $Q_{606}$ is connected to the second common gate line 12 and the second data line 22. The seventh switching element $Q_{607}$ is connected to the first common gate line 11 and the third data line 23. The eighth switching element $Q_{608}$ is connected to the second common gate line 12 and the second data line 22. The ninth switching element $Q_{609}$ is connected to the second common gate line 12 and the third data line 23. The tenth switching element $Q_{610}$ is connected to the first common gate line 11 and the second data line 22. The eleventh switching element $Q_{611}$ is connected to the first common gate line 11 and the third data line 23. The twelfth switching element $Q_{612}$ is connected to the second common gate line 12 and the third data line 23.

Accordingly, the pixel array of the LCD according to the exemplary embodiment of FIG. 6A has an overall 2×6 matrix occurring at repeated intervals.

Referring to FIG. 6B, a first signal and a second signal are alternately applied to the first to third data lines 21, 22, 23, respectively, which is substantially the same as described for the exemplary embodiment of FIG. 4A and a repeated explanation thereof will not be given.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A liquid crystal display comprising:
a pixel array having a plurality of pixels in a matrix on a substrate, the matrix having at least a first pixel row and a second pixel row adjacent the first pixel row, both the first pixel row and the second pixel row extending in a first direction, a first pixel and a second pixel of the first pixel row being adjacent to each other along the first direction, the first pixel and the second pixel respectively including a first switching element and a second switching element;
a first common gate line that extends in a second direction different from the first direction and is commonly connected to the first switching element and to the second switching element; and
a first data line and a second data line that extend in the first direction and are connected to the first switching element and to the second switching element, respectively,
wherein the first direction is a direction in which each of the data lines extend and the second direction is a direction in which each of the gate lines extend, and
wherein the second pixel row is adjacent in the second direction to the first pixel row,
wherein:
a third data line is further provided on the substrate,
the first data line, the second data line and the third data line are on the substrate at repeated intervals,
the second data line and the third data line are opposed to and substantially parallel to each other,
the first row is between the first data line and the second data line, and
the second pixel row is between the third data line and the first data line,
wherein:
a second common gate line is further provided on the substrate,
the first common gate line and second common gate line are on the substrate at repeated intervals,
the second common gate line is adjacent to and substantially parallel to the first common gate line, and
the second pixel is between the first common gate line and the second common gate line, and
wherein:
the pixel array includes six pixels in a 2×3 matrix, the six pixels including the first pixel, the second pixel, a third pixel, a fourth pixel, a fifth pixel and a sixth pixel,
the first pixel, the second pixel, and the third pixel having a third switching element, are in the first pixel row, the fourth pixel, the fifth pixel and the sixth pixel, respectively including a fourth switching element, a fifth switching element and a sixth switching element, are in the second pixel row, the third switching element is connected to the second common gate line and to the second data line, the fourth switching element is connected to the first common gate line and to the third data line, the fifth switching element is connected to the second common gate line and to the third data line, and the sixth switching element is connected to the second common gate line and to the first data line.

2. The liquid crystal display of claim 1, wherein:
to the first data line, a first signal is consecutively applied twice followed by a second signal consecutively applied twice, at repeated intervals, to the second data line, the second signal is consecutively applied twice followed by the first signal consecutively applied twice, at repeated intervals, and to the third data line, the first signal is consecutively applied twice followed by the second signal consecutively applied twice, at repeated intervals.

3. The liquid crystal display of claim 1, wherein the first signal and the second signal are alternately applied to adjacent data lines.

4. A liquid crystal display comprising:
a pixel array having a plurality of pixels in a matrix on a substrate, the matrix having at least a first pixel row and a second pixel row adjacent the first pixel row, both the first pixel row and the second pixel row extending in a first direction, a first pixel and a second pixel of the first pixel row being adjacent to each other along the first direction, the first pixel and the second pixel respectively including a first switching element and a second switching element;

a first common gate line that extends in a second direction different from the first direction and is commonly connected to the first switching element and to the second switching element; and a first data line and a second data line that extend in the first direction and are connected to the first switching element and to the second switching element, respectively, wherein the first direction is a direction in which each of the data lines extend and the second direction is a direction in which each of the gate lines extend, and wherein the second pixel row is adjacent in the second direction to the first pixel row, wherein:
a third data line is further provided on the substrate,
the first data line, the second data line and the third data line are on the substrate at repeated intervals,
the third data line and the second data line are opposed to and substantially parallel to each other,
the first pixel row is between the second data line and the first data line, and
the second pixel row is between the first data line and the third data line, wherein:
a second common gate line is further provided on the substrate,
the first common gate line and the second common gate line are on the substrate at repeated intervals,
the second common gate line is adjacent to and substantially parallel to the first common gate line, and
the second pixel is between the first common gate line and the second common gate lines, wherein:
the pixel array includes 12 pixels in a 2×6 matrix,
the first pixel row includes the first pixel, the second pixel, a third pixel, a fourth pixel, a fifth pixel and a sixth pixel, respectively including the first switching element, the second switching element, a third switching element, a fourth switching element, and a sixth switching element, along the first direction, the second pixel row includes a seventh pixel, an eighth pixel, a ninth pixel, a tenth pixel, an eleventh pixel and a twelfth pixel, respectively including a seventh switching element, an eighth switching element, a ninth switching element, a tenth switching element an eleventh switching element and a twelfth switching element, along the first direction, the third switching element is connected to the second common gate line and to the second data line, the fourth switching element is connected to a second first common gate line and to the second data line, the fifth switching element is connected to a second second common gate line and to the second data line, the sixth switching element is connected to the second second common gate line and to the first data line, the seventh switching element is connected to the first common gate line and to the third data line, the eighth switching element is connected to the second common gate line and to the third data line, the ninth switching element is connected to the second common gate line and to the first data line, the tenth switching element is connected to the second first common gate line and to the first data line, the eleventh switching element is connected to the second first common gate line and to the third data line, and the twelfth switching element is connected to the second second common gate line and to the third data line.

5. The liquid crystal display of claim 4, wherein the first signal and the second signal are alternately applied to adjacent data lines.

6. A liquid crystal display comprising:
a pixel array having a plurality of pixels in a matrix on a substrate, the matrix having at least a first pixel row and a second pixel row adjacent the first pixel row, both the first pixel row and the second pixel row extending in a first direction, a first pixel and a second pixel of the first pixel row being adjacent to each other along the first direction, the first pixel and the second pixel restively including a first switching element and a second switching element;

a first common gate line that extends in a second direction different from the first direction and is commonly connected to the first switching element and to the second switching element; and a first data line and a second data line that extend in the first direction and are connected to the first switching element and to the second switching element, respectively, wherein the first direction is a direction in which each of the data lines extend and the second direction is a direction in which each of the gate lines extend, and wherein the second pixel row is adjacent in the second direction to the first pixel row, wherein:
a third data line is further provided on the substrate,
the first data line, the second data line and the third data line are on the substrate at repeated intervals,
the third data line and the first data line are opposed to and substantially parallel to each other, the first pixel row is between the first data line and the second data line, and the second pixel row is between the second data line and the third data line, wherein:

a second common gate line is further provided on the substrate, the first common gate line and the second common gate line are on the substrate at repeated intervals, the second common gate line is adjacent to and substantially parallel to the first common gate line, and the second pixel is between the first common gate line and the second common gate line, and wherein:

the pixel array includes 12 pixels in a 2×6 matrix, the first pixel row includes the first pixel, the second pixel, a third pixel, a fourth pixel, a fifth pixel and a sixth pixel, respectively including the first switching element, the second switching element, a third switching element, a fourth switching element, a fifth switching element and a sixth switching element, along the first direction, the second pixel row includes a seventh pixel, an eighth pixel, a ninth pixel, a tenth pixel, an eleventh pixel and a twelfth pixel, respectively including a seventh switching element, an eighth switching element, a ninth switching element, a tenth switching element, an eleventh switching element and a twelfth switching element, along the first direction, the third switching element is connected to the second common gate line and to the first data line, the fourth switching element is connected to a second first common gate line and to the first data line, the fifth switching element is connected to a second second common gate line and to first data line, the sixth switching element is connected to the second second common gate line and to the second data line, the seventh switching element is connected to the first common gate line and to the third data line, the eighth switching element is connected to the second common gate line and to the second data line, the ninth switching element is connected to the second common gate line and to the third data line, the tenth switching element is connected to the second first common gate line and to the second data line, the eleventh switching element is connected to the second first common gate line and to the third data line, and the twelfth switching element is connected to the second second common gate line and to the third data line.

7. The liquid crystal display of claim 6, wherein the first signal and the second signal are alternately applied to adjacent data lines.

* * * * *